Sept. 25, 1951  C. PACE  2,569,330
LIGHTWEIGHT ELECTRIC MOTOR
Filed Oct. 27, 1948
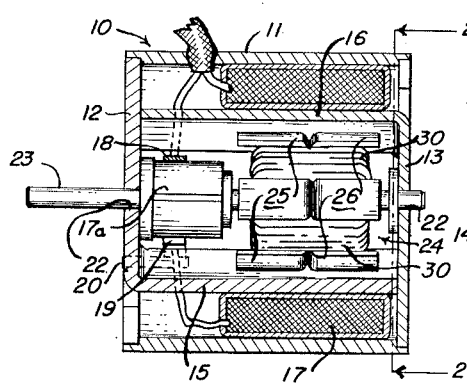
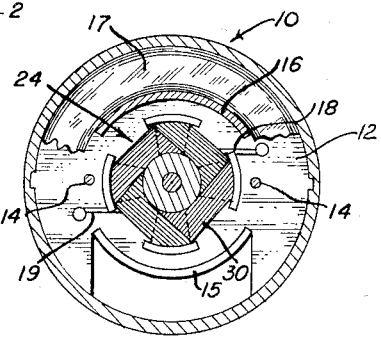
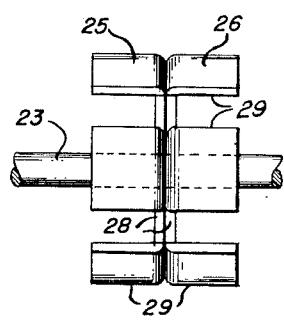
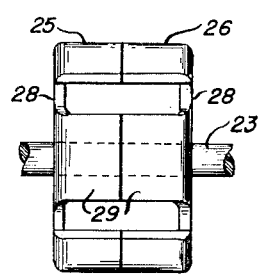
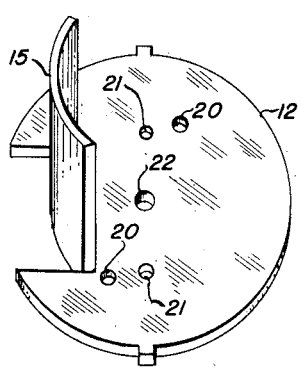
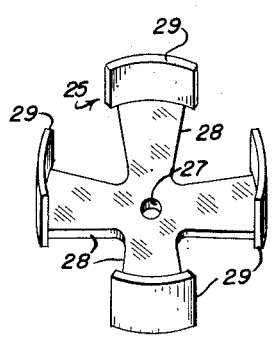
INVENTOR:-
CANIO PACE
BY H. G. Manning
ATTY.

Patented Sept. 25, 1951

2,569,330

UNITED STATES PATENT OFFICE 2,569,330

LIGHTWEIGHT ELECTRIC MOTOR

Canio Pace, Waterbury, Conn.

Application October 27, 1948, Serial No. 56,687

2 Claims. (Cl. 171—252)

1

This invention relates to electric motors, and more particularly to a motor operable on D. C. or A. C. and having improved rotor and stator structures.

One object of this invention is to provide a rotor of the above nature wherein the rotor core has no laminations, and the windings thereof are carried upon slotted cups, thereby reducing weight and expense of construction.

Another object is to provide a motor of the above nature in which the stator has a pair of integral end plates which serve as poles and also provide bearings for the rotor whereby its manufacture will be greatly simplified.

A further object is to provide a motor of the above nature which will be simple in construction, inexpensive to manufacture, easy to assemble and manipulate, compact, ornamental in appearance, and very efficient and durable in use.

With these and other objects in view, there have been illustrated, on the accompanying drawing, two forms in which the invention may conveniently be embodied in practice.

In the drawing,

Fig. 1 is a longitudinal sectional view of the improved motor.

Fig. 2 is a cross-sectional view of the same, taken on the line 2—2 of Fig. 1, showing the field coil partly broken away.

Fig. 3 is a perspective view of one of the stator plates.

Fig. 4 is a side view of the rotor showing the arrangement of the slotted cups in the armature core back-to-back, the windings being omitted.

Fig. 5 is a similar side view of a modified form of rotor core having the slotted cups arranged face-to-face.

Fig. 6 is a perspective view of one of the slotted cups.

Referring now to the drawings, in which like reference numerals denote corresponding parts throughout the several views, the numeral 10 indicates generally a stator comprising a cylindrical shell 11 and a pair of identical circular end plates 12, 13 which are secured against the ends of said shell by means of a pair of screws 14 extending through the interior of the shell 11 and engaged in the respective end plates.

The end plates 12, 13 are preferably made by stamping from soft sheet iron and are provided respectively with a pair of opposed integral pole pieces 15, 16, which are parallel to the axis of the motor and have a cross section which is curved concentrically therewith.

2

It will be understood that the end plates 12, 13 are reversed in position, so that the pole pieces 15, 16 are diametrically opposed within the motor so as to support an annular field coil 17 in the space between said pole pieces and the shell 11. If desired, however, a stator having a permanent magnet may be employed within the scope of the invention.

In order to conduct electric current from a power source to a commutator 17a, provision is made of suitable brush devices 18, 19, which are supported in apertures 20 in the end plate 12, as shown.

The end plates 12, 13 are also provided with apertures 21 for the securement of the screws 14, and central bearing apertures 22 in which the shaft 23 of a rotor 24 is journaled.

The rotor 24 comprises an armature core in the form of a pair of aligned slotted cups 25, 26, arranged in back-to-back relation. The cups 25, 26 are preferably stampings of sheet iron and are each provided with a central aperture 27 whereby said cups may be applied to the rotor shaft 23 with a press fit, and also have a plurality of radially-extending coplanar arms 28.

The outer end of each of the arms 28 is provided with an enlarged salient pole piece 29 which is bent at right-angles to the arm and is curved concentrically with the central aperture 27 so as to be disposed outwardly of the rotor shaft. It will be seen from Fig. 6 that each of the pole pieces 29 is slightly wider than the width of the arms 28, thus assisting in holding the armature windings 30 in place upon the arms 28, as seen in Fig. 2, and this construction also allows for good ventilation. The armature windings 30 will thus be disposed entirely within the confines of the slotted cups 25, 26, so that they will be protected against damage and will permit a very compact inexpensive rotor structure.

In the alternative arrangement shown in Fig. 5, the slotted cups 25, 26 are disposed in face-to-face arrangement, thus permitting the armature windings to embrace the respective arms 28 and providing a hollow armature.

It will be understood that any desired number of the slotted cups 25, 26 may be assembled on a shaft in order to provide an armature of the desired length, the outermost cups facing either outwardly, as shown in Fig. 4, or inwardly as shown in Fig. 5.

It will also be understood that the cups 25, 26 may be spaced apart any desired distance.

While there have been disclosed in this specification, two forms in which the invention may be embodied, it is to be understood that these forms are shown for the purpose of illustration only, and that the invention is not limited to the specific disclosures, but may be modified and embodied in various other forms without departing from its spirit. In short, the invention includes all the modifications and embodiments coming within scope of the following claims.

Having thus fully described the invention, what is claimed as new, and for which it is desired to secure Letters Patent, is:

1. In an electric motor, a stator comprising a pair of end plates having pole pieces extending inwardly therefrom and integral therewith, a rotor including a shaft journaled within said end plates, said rotor comprising a pair of slotted cups disposed back-to-back in abutting relationship on said shaft, each of said cups comprising a plurality of radially extending arms, a right angularly extending arcuate pole portion integrally formed with the outer end of each of said arms, the arcuate length of each of said pole portions being greater than and overhanging the width of its associated arm, whereby the rotor winding disposed about said arms will be constrained inwardly of said pole portions and the axial extent of said pole portions being beyond said winding whereby the overhanging outer ends will operate as a fan to cool said rotor.

2. In a rotor construction for an electric motor, the combination comprising a rotor shaft, a rotor member fixed on said shaft, said rotor member comprising a pair of slotted cups disposed back-to-back in abutting relationship on said shaft, each of said cups comprising a plurality of radially extending arms, a right angularly extending arcuate pole portion integrally formed on the outer end of each of said arms, the arcuate length of each of said pole portions being greater than and overhanging the width of its associated arm, whereby the rotor winding disposed about said arms will be constrained inwardly of said pole portions the axial extent of said pole portions being beyond said winding whereby, and the outer ends of said pole portions will operate as a fan to cool said rotor member.

CANIO PACE.

REFERENCES CITED

The following references are of record in the file of this patent:

UNITED STATES PATENTS

| Number | Name | Date |
|---|---|---|
| 259,404 | Little | June 13, 1882 |
| 548,402 | Storey | Oct. 22, 1895 |
| 1,655,286 | Nietsche | Jan. 3, 1928 |
| 1,933,498 | Morrill | Oct. 31, 1933 |
| 1,959,391 | Spencer | May 22, 1934 |
| 2,018,676 | Kohlhagen | Oct. 29, 1935 |
| 2,122,307 | Welch | June 28, 1938 |
| 2,212,192 | Howell | Aug. 20, 1940 |
| 2,243,063 | Arey | May 27, 1941 |
| 2,294,449 | Dickten | Sept. 1, 1942 |
| 2,512,848 | Brouwer | June 27, 1950 |

FOREIGN PATENTS

| Number | Country | Date |
|---|---|---|
| 522,621 | Great Britain | June 21, 1940 |